(12) United States Patent (10) Patent No.: US 8,566,794 B2
Rossi et al. (45) Date of Patent: Oct. 22, 2013

(54) CHECKPOINT ENTRY INSERTION DURING TEST SCENARIO CREATION

(75) Inventors: Claude Rossi, Vaibonne (FR); Gregory Martin, Antibes (FR)

(73) Assignee: SAP AG, Walldorf (DE)

( * ) Notice: Subject to any disclaimer, the term of this patent is extended or adjusted under 35 U.S.C. 154(b) by 439 days.

(21) Appl. No.: 12/907,298

(22) Filed: Oct. 19, 2010

(65) Prior Publication Data

US 2012/0096438 A1 Apr. 19, 2012

(51) Int. Cl.
*G06F 9/44* (2006.01)
(52) U.S. Cl.
USPC .......................................... 717/125; 717/126
(58) Field of Classification Search
USPC .................................................. 717/125, 126
See application file for complete search history.

(56) References Cited

U.S. PATENT DOCUMENTS

| | | | | |
|---|---|---|---|---|
| 5,070,534 A * | 12/1991 | Lascelles et al. | ............. | 715/764 |
| 5,630,047 A | 5/1997 | Wang | | |
| 6,336,149 B1 * | 1/2002 | Preston | ............................ | 710/1 |
| 7,373,636 B2 * | 5/2008 | Barry et al. | .................... | 717/124 |
| 7,385,585 B2 * | 6/2008 | Konaka et al. | ................. | 345/156 |
| 8,255,799 B2 * | 8/2012 | Kintzley et al. | ................ | 715/704 |
| 2005/0028146 A1 | 2/2005 | Quick | | |
| 2006/0101404 A1 * | 5/2006 | Popp et al. | ..................... | 717/124 |
| 2009/0306954 A1 | 12/2009 | Lee et al. | | |

OTHER PUBLICATIONS

Luo (Chinese Patent Publication CN 101620564, publish date Jan. 6, 2010).*

* cited by examiner

*Primary Examiner* — Li B Zhen
*Assistant Examiner* — Hang Pan
(74) *Attorney, Agent, or Firm* — Brake Hughes Bellermann LLP

(57) ABSTRACT

A test module can be configured to initiate test scenario creation for a target application, and an interaction entry definition module can be configured to define, during the test scenario creation, a plurality of interaction entries representing a sequence of user interactions with a plurality of user interface elements of the target application. A test scenario compiler can be configured to include the plurality of interaction entries in a test scenario file representing a test scenario, and a checkpoint entry definition module can be configured to receive an indicator that a property of a user interface element from the plurality of user interface elements has been selected for verification, and configured to define a checkpoint entry configured to trigger verification of the property of the user interface element from the plurality of user interface elements based on the test scenario file during test scenario verification of the target application.

20 Claims, 9 Drawing Sheets

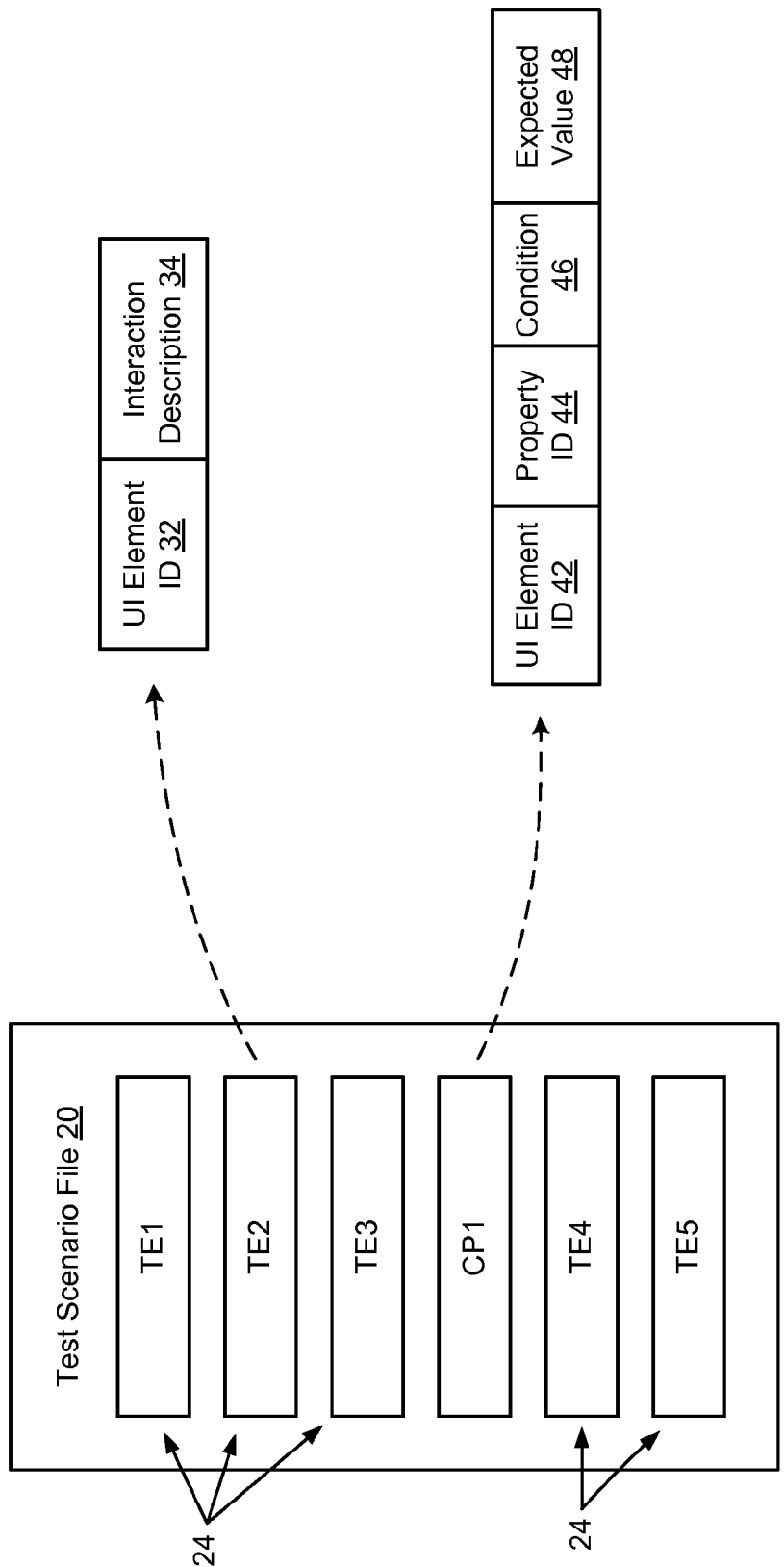

| Sets of Test Input Values 510 | UI Element ID 520 | Property Identifiers 530 | Conditions 540 | Expected Values 550 |
|---|---|---|---|---|
| IV1 ... IV6 | ID1 | PropA | OP1 | EV1 |
| IV7 ... IV9 | | | | EV2 |
| IV10 ... IV16 | | | | EV3 |
| IV17 ... IV22 | | | OP2 | EV4 |
| IV23 ... IV31 | | | | EV5 |

FIG. 5

CHECKPOINT ENTRY INSERTION DURING TEST SCENARIO CREATION

TECHNICAL FIELD

This description relates to recording test scenarios for applications targeted for verification testing.

BACKGROUND

Known test automation tools can be used to define test scenarios and to control execution of these test scenarios related to an application targeted for verification (e.g., verification testing). These known test automation tools may support automation of tasks such as application installation, test scenario creation, user interface (UI) interaction, problem detection (such as parsing, polling agents, etc.), defect logging, comparison of actual outcomes to predicted outcomes, setting up of test pre-conditions, and/or other test control and/or test reporting functions. These known test automation tools can also be configured to record, as a test scenario, user interactions (e.g., native events raised by an operating system (OS) in response to a user interaction) with a user interface (e.g., a graphical user interface) of a application targeted for testing. Hence, the test scenario can be created for the application via the user interface, and the application can be tested via the user interface based on the test scenario. Although there are advantages to this approach, inserting checkpoints into the test scenario using these known test automation tools and known techniques may require deep technical knowledge of the application, may result in undesirable inaccuracies, can be tedious for a user, and/or so forth. Thus, a need exists for systems, methods, and apparatus to address the shortfalls of present technology, and to provide other new and innovative features.

SUMMARY

In one general aspect, a computer system can include instructions stored on a non-transitory computer-readable storage medium. The computer system can include a test module configured to initiate test scenario creation for a target application, and an interaction entry definition module configured to define, during the test scenario creation, a plurality of interaction entries representing a sequence of user interactions with a plurality of user interface elements of the target application. The computer system can include a test scenario compiler configured to include the plurality of interaction entries in a test scenario file representing a test scenario. The computer system can also include a checkpoint entry definition module configured to receive, after a first portion of the sequence of user interactions have been performed and before a second portion of the sequence of user interactions have been performed, an indicator that a property of a user interface element from the plurality of user interface elements has been selected for verification, and configured to define a checkpoint entry configured to trigger verification of the property of the user interface element from the plurality of user interface elements based on the test scenario file during test scenario verification of the target application.

In another general aspect, a non-transitory computer-readable storage medium can store code representing instructions that when executed are configured to cause a processor to perform a process. The code can include code to initiate test scenario creation for a target application, and code to define, during the test scenario creation, a plurality of interaction entries representing a sequence of user interactions with a plurality of user interface elements of the target application. The code can include code to include the plurality of interaction entries in a test scenario file representing a test scenario, and code to receive, after a first portion of the sequence of user interactions have been performed and before a second portion of the sequence of user interactions have been performed, an indicator that a property of a user interface element from the plurality of user interface elements has been selected for verification. The code can also include code to define a checkpoint entry configured to trigger verification of the property of the user interface element from the plurality of user interface elements based on the test scenario file during test scenario verification of the target application.

In yet another general aspect, a method can include executing instructions recorded on a non-transitory computer-readable storage media using at least one processor. The method can include initiating test scenario creation for a target application, and defining, during the test scenario creation, a plurality of interaction entries representing a sequence of user interactions with a plurality of user interface elements of the target application. The method can include including the plurality of interaction entries in a test scenario file representing a test scenario, and receiving, after a first portion of the sequence of user interactions have been performed and before a second portion of the sequence of user interactions have been performed, an indicator that a property of a user interface element from the plurality of user interface elements has been selected for verification. The method can also include defining a checkpoint entry configured to trigger verification of the property of the user interface element from the plurality of user interface elements based on the test scenario file during test scenario verification of the target application.

The details of one or more implementations are set forth in the accompanying drawings and the description below. Other features will be apparent from the description and drawings, and from the claims.

BRIEF DESCRIPTION OF THE DRAWINGS

FIG. 2A is a diagram that illustrates a representation of a test scenario file.

FIG. 5 is a diagram that illustrates a test parameter file.

DETAILED DESCRIPTION

Figure 1:
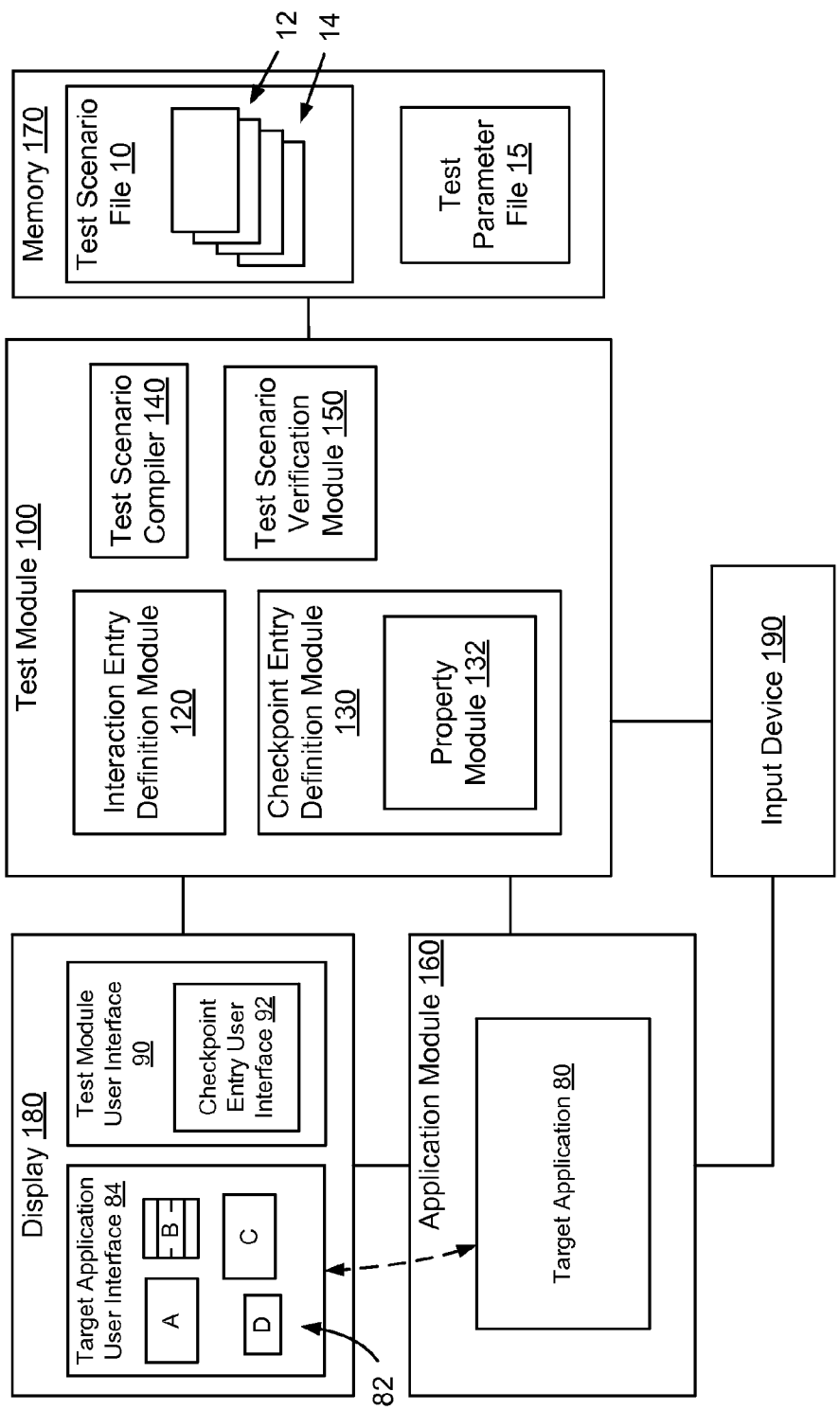
FIG. 1 is a diagram that illustrates a test module configured to produce a test scenario file based on interactions of a user with user interface elements of a target application.

FIG. 1 is a diagram that illustrates a test module 100 configured to produce a test scenario file 10 based on interactions of a user (not shown) with user interface elements 82 of a target application 80. As shown in FIG. 1, the user interface elements 82 of the target application 80 can collectively define a target application user interface 84 of the target application 80. In some embodiments, the target application 80 can be, for example, a financial application, a business process application, a human resources application, an engineering application, and/or so forth. In some embodiments, the target application 80 can be an enterprise application. In this embodiment, one or more portions of the target application 80 are executed, or triggered for execution, using an application module 160. Although not shown in FIG. 1, the application module 160 can include one or more processors and/or memory components.

The user interface elements 82 of the target application 80 can be associated with (e.g., configured to trigger, configured to control) any function of the target application 80. For example, the user interface elements 82 (which define the target application user interface 84) can be configured to manage, can represent, and/or be triggered by one or more functions of the target application 80. The user interface elements 82 of the target application 80 (which includes user interface elements A through D) can be any type of user interface element that can be associated with a user interface (e.g., graphical user interface). For example, the user interface elements 82 can be, or can include, visual indicators, images (e.g., icons), text-based objects, menus, links (e.g., hyperlinks), buttons, fields, command-line interfaces, and/or so forth.

Interactions with the user interface elements 82 of the target application 80 can be performed using an input device 190 (via the application module 160), which can be, for example, a keyboard device, a mouse device, an electrostatic touchpad device, and/or so forth. User interactions (also can be referred to as events) can include, for example, inserting text into one or more user face elements 82, selecting one or more of the user interface elements 82, moving one or more of user interface elements 82, accessing functionality associated with one or more of the user interface elements 82, and/or so forth.

As a specific example, user interface element C can be a field into which alphanumeric characters can be entered by a user of the target application 80 via the input device 190. In some embodiments, one or more of the user interface elements 82 can be referred to as a user interface control, or as a user interface object. As shown in FIG. 1, the user interface elements 82 that define the target application user interface 84 are displayed (e.g., rendered) within a display 180.

Also, as shown in FIG. 1, a test module user interface 90 is displayed (e.g., rendered) within the display 180. The test module user interface 90 can be associated with (e.g., can be configured to manage, can represent, can be triggered by) one or more functions of the test module 100. Although not shown in FIG. 1, the test module user interface 90, similar to the target application user interface 84, can include one or more user interface elements.

The test module 100 can be configured to produce (e.g., create) a test scenario file 10 for the target application 80 that represents a test scenario. In some embodiments, the test scenario file 10 of the target application 80 can be defined, at least in part, based on recording of a sequence of user interactions (triggered using the input device 190) with the user interface elements 82 of the target application 80 to perform a particular function (e.g., a business task, trigger a calculation) of the target application 80. After the test scenario file 10 has been produced, the test scenario file 10 can be executed (e.g., executed under various conditions) at a later time to test (e.g., verify) the particular function of the target application 80 as triggered by the sequence of user interactions recorded in the test scenario file 10.

The test scenario file 10 can be produced by the test module 100 during test scenario creation (e.g., a test scenario creation stage, a test scenario creation time period). The test scenario file 10 can include entries corresponding to interactions of a user (which can be referred to as user interactions) with the user interface elements 82 of the target application 80 and entries that can be used to verify values of properties of the user interface elements 82 of the target application 80. The entries corresponding to interactions of a user with the user interface elements 82 of the target application 80 can be referred to as interaction entries 12, and entries that can be used to verify values of properties of the user interface elements 82 of the target application 80 can be referred to as checkpoint entries 14. In some embodiments, the test scenario file 10 can be collectively defined by the interaction entries 12 and the checkpoint entries 14. In some embodiments, the interaction entries 12 and the checkpoint entries 14 can be generically referred to as entries of the test scenario file 10.

An interaction entry definition module 120 of the test module 100 can be configured to define the interaction entries 12 based on interactions of a user with the user interface elements 82 of the target application 80 during test scenario creation. Specifically, an interaction entry definition module 120 can be configured to define interaction entries 12 that represent each of the interactions of a user with the user interface elements 82 of the target application 80 during test scenario creation. The defining of interaction entries 12 based on interactions of a user with the user interface elements 82 of the target application 80 during test scenario creation can be referred to as recording, or as recording of the test scenario. In other words, interaction entries 12 of the test scenario file 10 can be produced by recording interactions of a user (e.g., specified interactions of the user) with the user interface elements 82 of the target application 80. In some embodiments, only a specified set of interactions (e.g., selections of fields, entering of input values, actuations of buttons, etc.) of a user with the user interface elements 82 of the target application 80 may be recorded as interactions entries 12.

For example, after test scenario creation for the target application 80 has been initiated (e.g., initiated by a user), a sequence of user interactions with the user interface elements 82 of the target application 80 to perform a particular function (e.g., a business task, trigger a calculation) using the target application 80 can be defined as interaction entries 12 and included in a test scenario file 10. The sequence of interactions can include, for example, the insertion of text into one of the user interface elements C (which can be a field), selection of user interface elements D (which can be an image), accessing user interface element A (which can be a link), responding to one of the user interface elements B (which can be a prompt), and/or so forth. Details related to parameters (such as properties) that can be included in (e.g., identified within) one or more of interaction entries to represent an interaction of a user are described in connection with the remaining figures.

In some embodiments, test scenario creation can be initiated in response to a button (not shown) in the test module user interface 90 being actuated. Also, test scenario creation can be terminated in response to another button (not shown) in the test module user interface 90 being actuated. Specific examples of a test module user interface are described, for example, in connection with FIGS. 6A through 6F.

A checkpoint entry definition module 130 of the test module 100 can be configured to define the checkpoint entries 14 during test scenario creation (e.g., during recording of a test scenario). The checkpoints can be associated with one or more of the user interface elements 82 of the target application 80 by a user during test scenario creation. For example, an interaction with user interface element C of the target application 80 can be represented as an interaction entry by the interaction entry definition module 120. After the interaction entry has been defined by the interaction entry definition module 120 and included as one of the interaction entries 12 of the test scenario file 10, a user can indicate that a checkpoint should be included in the test scenario file 10. Accordingly, a checkpoint entry can be defined by the checkpoint entry definition module 130 based on instructions from a user, and can be included as one of the checkpoint entries 14 of the test scenario file 10.

In some embodiments, one or more of the checkpoint entries 14 can be defined to trigger verification (e.g., verification testing) of a value of a property of one or more of the user interface elements 82. In some embodiments, a property of a user interface element can include various types of properties such as, for example, a size of the user interface element, a location of the user interface element, a color of the user interface element, a variable associated with the user interface element, and/or so forth.

As shown in FIG. 1, the test module user interface 90 includes a checkpoint entry user interface 92. In some embodiments, the checkpoint entry user interface 92 can be configured to trigger at least some of the functionality of the checkpoint entry definition module 130. For example, one or more portions of the checkpoint entries 14 can be defined via the checkpoint entry user interface 92 (and using the input device 190). For example, a value of a property of one or more of the user interface elements 82 to be verified (e.g., selected for verification), one or more expected value of a property of one or more of the user interface elements 82, and/or so forth can be defined (e.g., selected) via the checkpoint entry user interface 92. Specific examples of portions of a checkpoint entry user interface are described, for example, in connection with FIGS. 6A through 6F.

In some embodiments, the interaction entries 12 can be defined during a time period that is mutually exclusive from a time period during which the checkpoint entries 14 are defined. For example, at least a portion of the interaction entries 12 can be defined during a first time period, and at least a portion of the checkpoint entries 14 can be defined during a second time period that is mutually exclusive from the first time period. After the portion of the checkpoint entries 14 have been defined during the second time period, defining of one or more of the interaction entries 12 can be resumed. Moreover, context can be changed between recording user interactions (e.g., defining interaction entries 12) based on user interaction with the user interface elements 82 of the target application 80 and defining one or more checkpoint entries 14 (using the checkpoint entry definition module 130).

In this embodiment, the interaction entries 12 can be automatically defined by the interaction entry definition module 120 based on interactions of a user with the user interface elements 82 of the target application 80. At least portions of the checkpoint entries 14, however, may be manually defined by the user. For example, the checkpoint entry user interface 92 can be activated (e.g., manually activated) by a user so that at least one of the checkpoint entries 14 may be defined and included in the test scenario file 10. In some embodiments, when a user activates the checkpoint entry user interface 92 to insert a checkpoint entry 14 into the test scenario file 10, the checkpoint entry 14 can be defined based on one or more default parameters and the default parameters may be manually modified by (or specified by) a user. Because the interactions of the user while defining one or more of the checkpoint entries 14 are not interactions with the user interface elements 82 of the target application 80, these interactions of the user may not be recorded as one or more of the interaction entries 12.

As shown in FIG. 1, the test module 100 includes a test scenario compiler 140 configured to define the test scenario file 10 based on the interaction entries 12 defined by the interaction entry definition module 120 and the checkpoint entries 14 defined by the checkpoint entry definition module 130. In other words, the test scenario compiler 140 is configured to compile (e.g., assembly, link) the entries defined by the interaction entry definition module 120 and the checkpoint entry definition module 130 to define the test scenario file 10.

The test scenario compiler 140 can be configured to define the test scenario file 10 based on an order that the entries (e.g., interaction entries 12, checkpoint entries 14) of the test scenario file 10 are defined by the interaction entry definition module 120 and the checkpoint entry definition module 130. In other words, the entries of the test scenario file 10 can correspond with an order that the entries are defined. For example, a checkpoint entry from the checkpoint entries 14 can be defined by the checkpoint entry definition module 130 at a time in between times that two interaction entries from the interaction entries 12 that are created by the interaction entry definition module 120, and these entries can be included in (or linked within) the test scenario file 10 in that order. In other words, the test scenario file 10 can be defined so that the checkpoint entry from the checkpoint entries 14 is at a location (e.g., a logical location) between the two interaction entries from the interaction entries 12. For example, the checkpoint entry can be logically linked to a first interaction entry before the checkpoint entry and logically linked to a second interaction entry after the checkpoint entry so that the checkpoint entry is at a logical location between the first interaction entry and the second interaction entry. In some embodiments, the checkpoint entry can be logically linked in, for example, a linked listed.

After interaction entries 12 and checkpoint entries 14 of the test scenario file 10 have been defined during test scenario creation, the test scenario file 10 can be used by a test scenario verification module 150 of the test module 100 to verify (e.g., test) the target application 80 during test scenario verification (e.g., a test scenario verification stage, a test scenario verification time period). For example, the test scenario verification module 150 can be configured to execute (e.g., replay, execute in a simulated fashion) the interactions of the user with the user interface elements 82 of the target application 80 in various test situations (e.g., using various types of hardware, using different platforms) based on the interaction entries 12 of the test scenario file 10. Also, the test scenario verification module 150 can use the checkpoint entries 14 to verify one or more values of properties associated with the user interface elements 82 of the target application 80 (which can be referred to as property verification, or verification of a property). In some embodiments, test scenario verification using the test scenario verification module 100 can be managed via the test module user interface 90.

In some embodiments, one or more of the checkpoint entries 14 can include one or more expected values of a property of one or more of the user interface elements 82 identified within the checkpoint entries 14. The expected values can be used to verify a value of the property calculated during test scenario verification. For example, a calculated value of a property of a user interface element from the user interface elements 82 can be calculated based on execution of a portion of interaction entries 12 of the test scenario file 10 during test scenario verification. The calculated value can be compared with (e.g., compared with using the Boolean operator, compared based on a condition) an expected value included in a checkpoint entry 14 associated with the property of the user interface element from the user interface elements 82.

As shown in FIG. 1, the checkpoint entry definition module 130 includes a property module 132. The property module 132 can be configured to discover one or more properties associated with one or more of the user interface elements 82 associated with one or more of the checkpoint entries 14. In some embodiments, the discovered properties can be used to define one or more of the checkpoint entries 14. More details related to parameters (such as properties) that can be included in (e.g., identified within) one or more of the checkpoint entries 14 are described in connection with the remaining figures.

As shown in FIG. 1, a test parameter file 15 can be stored in the memory 170. The test parameter file 15 can be used in conjunction with the test scenario file 10 during test verification to iteratively verify one or more portions (e.g., one or more properties of one or more of the user interface elements 82) of the target application 80. For example, the test parameter file 15 can include multiple sets of test input values that are each associated with an expected value. Each set of test input values can be used in conjunction with the interaction entries 12 (in lieu of input values used by the user during recording of the interaction entries 12) to calculate a calculated value that can be verified at a checkpoint based on each expected value associated with each set of test input values. As a specific example, a first set of test input values included in the test parameter file 15 can be associated with a first expected value, and a second set of test input values included in the test parameter file 15 can be associated with a second expected value. The first set of test input values can be used in conjunction with a sequence of the interaction entries 12 (which correspond to a sequence of user interactions) to calculate a first calculated value during a first iteration of test scenario verification, and the first calculated value can be verified at a checkpoint based on the first expected value (which is associated the first set of test input values). Similarly, the second set of test input values can be used in conjunction with the same sequence of interaction entries 12 to calculate a second calculated value during a second iteration of test scenario verification, and the second calculated value can be verified at the same checkpoint based on the second expected value (which is associated with the second set of test input values). More details related to test scenario verification based on a test scenario file are discussed below in connection with the remaining figures.

As discussed above, checkpoint entries 14 can be defined and added to the test scenario file 10 during test scenario creation. Specifically, checkpoint entries 14 can be defined and added to the test scenario file 10 during the same timeframe during which the interaction entries 12 are defined and added to the test scenario file 10, and not after recording of user interactions (as interaction entries 12) defining the test scenario have been completed. Thus, checkpoint entries 14 can be defined and included, in a precise fashion, within the test scenario file 10 in conjunction with the interaction entries 12 because the checkpoints can be defined (by a user) during test scenario creation. Moreover, a checkpoint entry related to a particular user interface element 82 of the target application 80 can be added directly after a user interaction with the particular user interface element 82 of the target application 80. This is contrasted with adding one or more checkpoints (i.e., adding one or more checkpoint entries) to a test scenario after recording the test scenario has been completed (in a post-processing fashion), which can result in undesirable inaccuracies and may be time-intensive especially in cases where the recorded test scenario includes many interaction entries.

In some embodiments, one or more portions of the components shown in the test module 100 in FIG. 1A can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the checkpoint entry definition module 130 can be, or can include, a software module configured for execution by at least one processor (not shown). The processor can be configured to execute one or more instructions and can include one or more co-processors and/or memory portions. In some embodiments, the functionality of the components can be included in different modules and/or components than those shown in FIG. 1. For example, although not shown, the functionality of the checkpoint entry definition module 130 can be included in a different module than the test module 100, or divided into several different modules.

In some embodiments, one or more of the user interfaces (e.g., the target application user interface 84, the tests module user interface 90) shown in FIG. 1 can be, for example, a browser-based user interface that includes various buttons, links, controls, services, and/or so forth that can be used by a user (such as a user 10) to access the functionality of the test module 100 and/or the application module 160. In some embodiments, the user interfaces associated with the test module 100 can be different than that shown in FIG. 1. For example, the checkpoint entry user interface 92 can be separate from the test module user interface 90 (which can be associated with a third party test module application). In such instances, the check point entry user interface 92 (and/or the functionality associated therewith) can be configured to interface with the test module user interface 90 (and/or the functionality associated therewith)

Although not shown in FIG. 1, the test module 100, the application module 160, the memory 170, the display 180, and/or the input device 190 can be associated with, or can be included in (e.g., can define at least a portion of), one or more computer systems. The computer system can be, for example, a wired device and/or a wireless device (e.g., wi-fi enabled device) and can be, for example, a computing entity (e.g., a personal computing device), a mobile phone, a personal digital assistant (PDA), a server device (e.g., a web server), a host device, and/or so forth. The computer system can be configured to operate based on one or more platforms (e.g., one or more similar or different platforms) that can include one or more types of hardware, software, firmware, operating systems, runtime libraries, and/or so forth. In some embodiments, the computer system could be a cluster of devices (e.g., a server farm).

In some embodiments, the components shown in FIG. 1, such as the test module 100, the application module 160, the memory 170, the display 180, and/or the input device 190 can be configured to operate within a network. In other words, the components can be configured to function within various types of network environments that can include one or more client devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

Although not shown, in some embodiments, any of the components shown in FIG. 1 can be configured to operate within, for example, a data center (e.g., a cloud computing environment), one or more server/host devices, and/or so forth. In some embodiments, the functionality of the components shown in FIG. 1 (e.g., the test module 100) can be distributed to several devices.

Although not shown, in some embodiments, the memory 170 can be implemented as more than one memory component (e.g., more than one random-access memory (RAM) component or disk drive memory) associated with the test module 100. In some embodiments, the memory 170 can be a database memory. In some embodiments, the memory 170 can be, or can include, a non-local memory (e.g., a memory not physically included within the process module 100). For example, the memory 170 can be, or can include, a memory shared by multiple devices (not shown). In some embodiments, the memory 170 can be associated with a server device (not shown) within a network and configured to serve the test module 100.

FIG. 2A is a diagram that illustrates a representation of a test scenario file 20. In this embodiment, the test scenario file 20 includes interaction entries TE1 through TE5 (collectively referred to as interaction entries 24), and checkpoint entry CP1. The interaction entries 24 can represent various types of interactions of a user with user interface elements of a target application user interface of a target application (not shown). For example, interaction entry TE1 can represent a user opening a dialog box (which is a user interface element) of the target application user interface, interaction entry TE2 can represent the user pressing a button (which is a user interface element) within the dialog box of the target application user interface, and interaction entry TE3 can represent the user entering a value into a field (which is a user interface element) of the dialog box of the target application user interface. The checkpoint entry CP1 can include information that can be used to verify, during test scenario verification, the value entered into the field by the user.

In this embodiment, the order (or order of logical linking at a logical location) of the interaction entries 24 included in the test scenario file 20 corresponds with an order of a sequence of user interactions with the user interface elements of the target application user interface, or corresponds with an order that the interaction entries are defined in response to the sequence of user interactions. The checkpoint entry CP1 is included in the test scenario file 20 between (e.g., logically located between) interaction entries TE3 and TE4, because the checkpoint entry CP1 is defined at a time between the user interactions (or interaction entry definition times) that correspond with the interaction entries TE3 and TE4. A timeline that illustrates times that the interaction entries 24 and the checkpoint entry CP1 are defined is shown in FIG. 2B.

Figure 2B:
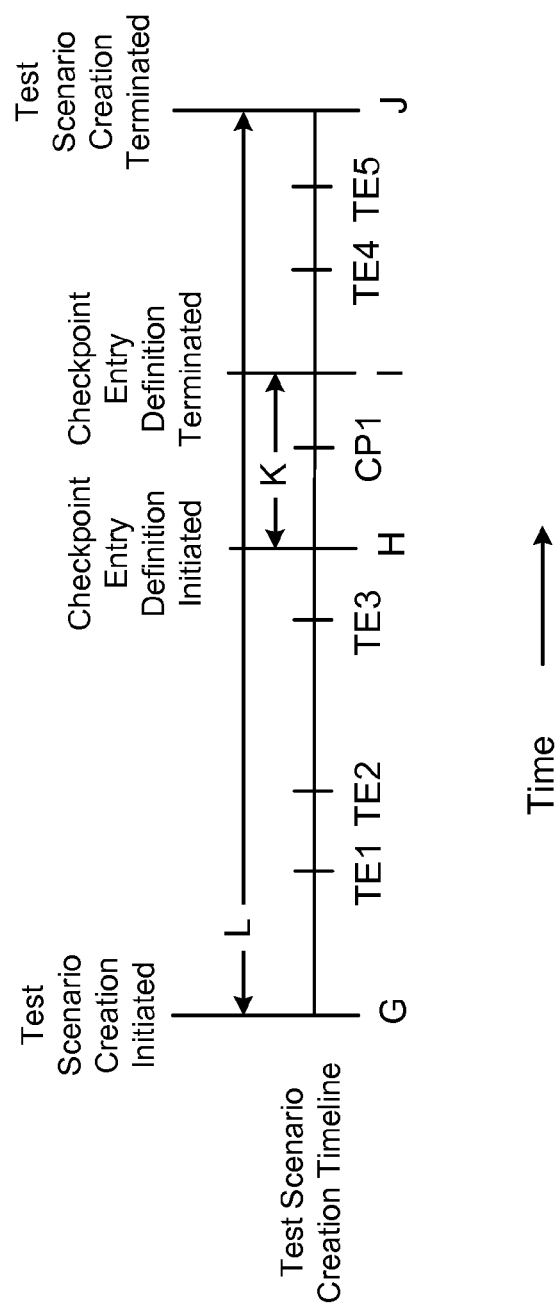
FIG. 2B is a test scenario creation timeline that illustrates times that entries of the test scenario file shown in FIG. 2A are defined.

FIG. 2B is a test scenario creation timeline that illustrates times that entries of the test scenario file 20 shown in FIG. 2A are defined. As shown in FIG. 2B, test scenario creation is initiated at time G and test scenario creation is terminated at time J. The time period between time G and time J can be referred to as a test scenario creation time period L.

Times at which the interaction entries 24 are defined are shown along the test scenario creation timeline. For example, as shown in FIG. 2B, interaction entry TE1 is defined at a time, which is before a time that interaction entry TE2 is defined. The interaction entries TE1 and TE2 can each be automatically defined in response to separate user interactions (which can occur shortly before each of the corresponding interaction entries is defined). In some embodiments, the interaction entries 24 can be automatically defined by an interaction entry definition module (e.g., interaction entry definition module 120 shown in FIG. 1), and after the interaction entries 24 have been defined, the interaction entries 24 can be included in the test scenario file 20 by a test scenario compiler (e.g., test scenario compiler 140 shown in FIG. 1).

As shown in FIG. 2B, checkpoint entry CP1 is defined at a time between interaction entry TE3 and interaction entry TE4 during a checkpoint entry definition time period K. The checkpoint entry definition time period K is initiated at time H and the checkpoint entry definition time period K is terminated at time I.

In some embodiments, the checkpoint entry definition time period K can be initiated at time H in response to a user interacting with a checkpoint entry user interface (such as checkpoint entry user interface 92 shown in FIG. 1). Thus, the checkpoint entry definition time period K can be initiated (e.g., manually initiated) by a user. Accordingly, the checkpoint entry can be inserted at a desirable location (e.g., at a location associated with a particular user interaction with a user interface element of the target application).

In some embodiments, the checkpoint entry definition time period K can be initiated at time H in response to a checkpoint entry user interface being activated. The checkpoint entry definition time period K can be terminated at time I in response to the checkpoint entry user interface being deactivated. In some embodiments, the checkpoint entry definition time period K can be initiated at time H in response to a user discontinuing interaction with user interface elements of a target application user interface (e.g., target application user interface 84 shown in FIG. 1), and initiating interaction with a checkpoint entry user interface. The checkpoint entry definition time period K can be terminated at time I in response to a user discontinuing interaction with the checkpoint entry user interface and continuing interaction with the user interface elements of a target application user interface. In some embodiments, interaction entries may not be defined in response to user interactions during the checkpoint entry definition time period K. In other words, defining of interaction entries in response to user interactions can be paused during the checkpoint entry definition time period K.

As shown in FIG. 2B, the checkpoint entry CP1 is included in the test scenario creation timeline between a first portion of the interaction entries 24 (which are associated with a first portion of a sequence of user interactions) (i.e., interaction entries TE1 through TE3) and before a second portion of the interaction entries 24 (which are associated with a second portion of a sequence of user interactions) (i.e., interaction entries TE4 and TE5). In some embodiments, the checkpoint entry CP1 can be defined (during the checkpoint entry definition time period K) after the first portion of the sequence of user interactions have been performed and before a second portion of the sequence of user interactions have been performed.

In some embodiments, the checkpoint entry CP1 can be associated with any property of a user interface element of a target application. In some embodiments, for example, the checkpoint entry CP1 can be associated with a property of a user interface element associated with interaction entry TE1 or interaction entry TE2, which are not defined directly before checkpoint entry CP1 (interaction entry TE3 is defined directly before checkpoint entry CP1). As another example, the checkpoint entry CP1 does not have to be associated with a property of the user interface element that is a subject of one or more of the interaction entries 24. In other words, the checkpoint entry CP1 can be associated with a property of a user interface element with which a user has not interacted during test scenario creation.

As shown in FIG. 2B, the test scenario creation time period L is a continuous time period (which includes the checkpoint entry definition time period K) during which the test scenario creation file 20 (which includes both interaction entries 24 and checkpoint entry CP1) is created. Although not shown in FIG. 2B, in some embodiments a test scenario creation file, such as test scenario creation file 20, can be defined during multiple test scenario creation time periods that can each be similar to test scenario creation time period L. For example, a first portion of a test scenario creation file (which can include both interaction entries and checkpoint entries) can be defined during a first test scenario creation time period, and a second portion of the test scenario creation file (which can include both interaction entries and checkpoint entries) can be defined during a second test scenario creation time period.

Referring back to FIG. 2A, the interaction entries 24 can include various types of parameters. As shown in FIG. 2A, the interaction entry TE2 can include a user interface element identifier 32 and an interaction description 34. The user interface element identifier 32 can be an identifier of a user interface element that a user interacts with as described in the interaction description 34. In some embodiments, the interaction entries 24 can include the same types of parameters, or different parameters than those shown in connection with interaction entry TE2.

In some embodiments, the interaction entries 24 can be automatically defined by an interaction entry definition module, such as interaction entry definition module 120 shown in FIG. 1, during test scenario creation. In some embodiments, one or more of the interaction entries 24 can be modified by a user (e.g., manually modified by a user via a test module such as test module 100 shown in FIG. 1) after the one or more interaction entries 24 have been automatically defined. In some embodiments, one or more of the interaction entries 24 (or parameters thereof) can be manually defined by a user.

The user interface (UI) element identifier (ID) 32 can be any type of identifier that can be used to identify a user interface element associated with, for example, a target user interface of a target application. The user interface element identifier 32 can be any type of identifier that can be used to identify a particular user interface element during test scenario verification. For example, if the user interface element identifier 32 is a field into which text can be inserted, the user interface element identifier 32 can be an identifier of the field. In some embodiments, the user interface element identifier 32 can be, for example, a globally unique identifier (GUID), a universal resource identifier (URI), and/or so forth.

The interaction description 34 can be any type of description that can be used to reproduce an interaction of a user with user interface elements identified by the user interface element identifier 32, for example, during test scenario verification. In some embodiments, the interaction description 34 can include information about a value included in a property of a user interface element (identified using the user interface element identifier 32), a function or a method of a user element, a state of a user interface element (e.g., an activated state, a deactivated state), and/or so forth.

As shown in FIG. 2A, the checkpoint entry CP1 can include a user interface element identifier 42, a property identifier 44, a condition 46, and an expected value 48. In some embodiments, a checkpoint entry can include the same types of parameters, or different parameters than those that shown in connection with checkpoint entry CP1.

The user interface element identifier 42 can be the same as, or similar to, the user interface element identifier 32 described in connection with the interaction entries 24. Specifically, the user interface element identifier 42 can be any type of identifier that can be used to identify a particular user interface element during test scenario verification. In some embodiments, the user interface element identifier 42 can be associated with a user interface element with which a user has not interacted during test scenario creation.

The property identifier 44 can be an identifier of a property of user interface element identifier 42. In some embodiments, the property can include, for example, a size of the user interface element, a location of the user interface element, a color of the user interface element, a variable associated with the user interface element, and/or so forth.

The expected value 48 can be an expected value of the property identified by the property identifier 44. For example, an expected text string for a textual property (which can be identified using the property identifier 44) of a user interface element (which can be identified using the user interface element identifier 42) can be included in a checkpoint entry as the expected value 48.

The condition 46 can indicate a manner in which the expected value 48 should be related to a calculated value associated with the property identified by the property identifier 44. For example, the condition 46 can be a Boolean operator, can include an algorithm, and/or so forth. As a specific example, the condition 46 can be a Boolean operator indicating that the expected value 48 for a property (identified using the property identifier 44) of a user interface element (identified using the user interface element identifier 42) should be equal to a calculated value of the property. An indicator that a failure has occurred can be generated if, during test scenario verification based on the test scenario file 20, the calculated value of the property does not equal the expected value 48 included in the checkpoint entry. In other words, an indicator that a failure (or success) has occurred can be generated if, during test scenario verification, a calculated value and an expected value do not (or does) satisfy a condition included in a checkpoint entry.

In some embodiments, one or more portions of the checkpoint entry CP1 can be defined manually by a user during the checkpoint entry definition time period K via a checkpoint entry user interface. Thus, the property to be verified and the expected value of the property can be manually defined (e.g., selected) by a user (and an indicator can be defined and used to trigger defining of at least a portion of the checkpoint entry CP1). More details related to manual selection of parameters of a checkpoint entry are described, for example, in connection with FIGS. 6A through 6F.

In some embodiments, the test scenario file 20 can be, or can include, a text-based file. In some embodiments, the test scenario file 20 can be represented in a database as entries in the database, as a linked list, and/or so forth. In some embodiments, the test scenario file 20 can be, or can include, any type of executable software module such as a computer program based on, but not limited to, micro-code or micro-instructions, machine instructions, such as produced by a compiler, code used to produce a web service, and files containing higher-level instructions that are executed by a computer using an interpreter. For example, or more portions of a test scenario file 20 may be implemented using Java, C++, or other programming languages (e.g., object-oriented programming languages) and development tools. In some embodiments, one or more portions of the test scenario file 20 may be visible (e.g., may be represented to a user in a display) as the test scenario file 20 is being created. In some embodiments, the test scenario file 20 can be, or can include, a user interface component, and the user interface component can be configured for display (e.g., rendering). In some embodiments, one or more portions of the test scenario file 20 can be defined using a background process with functionality that is not visible (i.e., not displayed).

Although not shown in FIGS. 2A and 2B, in some embodiments, a checkpoint entry can be associated with more than one property of more than one user interface element of the target application. For example, a checkpoint entry can be associated with multiple properties (and multiple expected values) of a user interface element that is the subject of an interaction entry. As another example, a checkpoint entry can be associated with a first property of a first user interface element, and can be associated with a second property of a second user interface element. Each of the user interface elements can be associated with different user interactions. In such embodiments, a checkpoint entry can include more than one user interface element identifier (also can be referred to as a control name), more than one property identifier, more than one condition, more than one expected value, and/or so forth.

Although not shown in FIG. 2B, in some embodiments, more than one checkpoint entry can be defined during the checkpoint entry definition time period K. Thus, multiple checkpoint entries (where each checkpoint entry can be associated with one or more expected values) can be included in a test scenario file 20 between sets of interaction entries. Although not shown in FIG. 2B, in some embodiments, multiple checkpoint entry definition time periods can be triggered during a test scenario creation time period, such as test scenario creation time period L.

Figure 3:
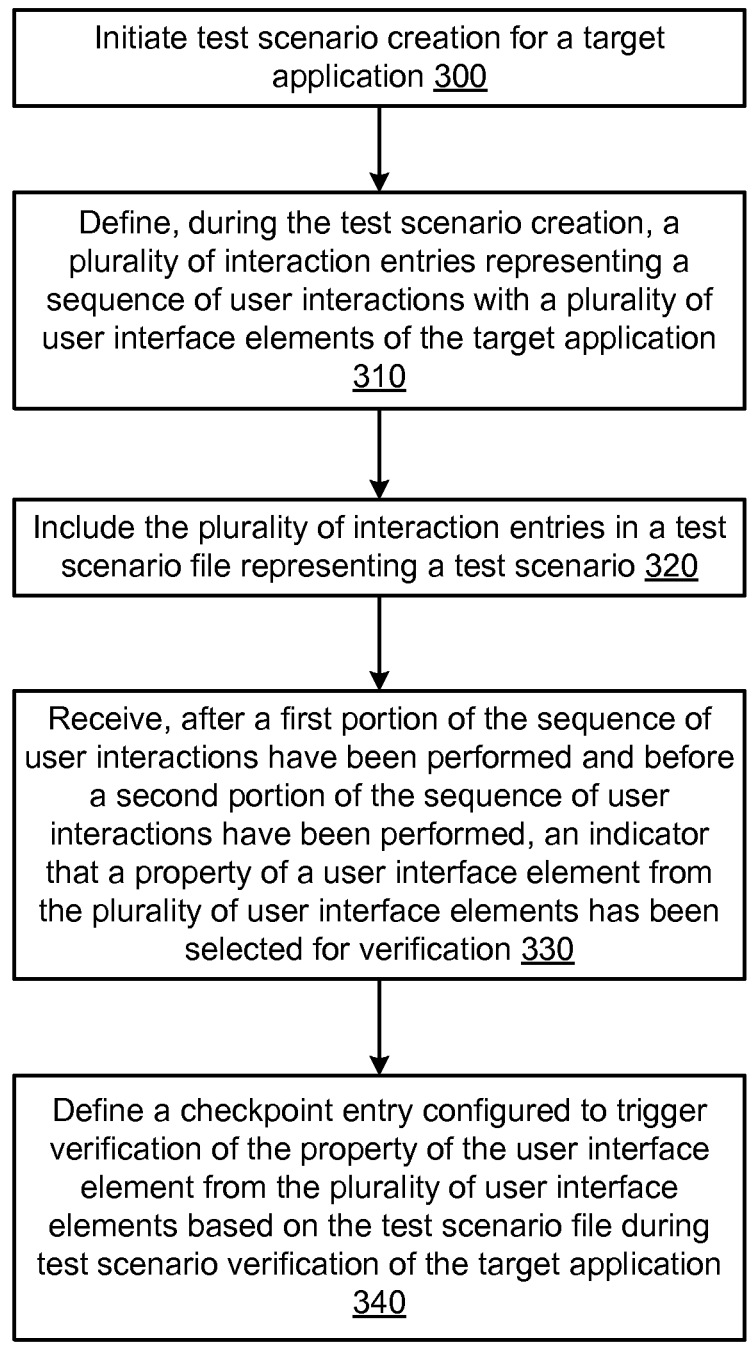
FIG. 3 is a flowchart that illustrates a method for defining a test scenario file.

FIG. 3 is a flowchart that illustrates a method for defining a test scenario file. At least some portions of the method shown in FIG. 3 can be performed by a test module such as test module 100 shown in FIG. 1. In some embodiments, the test module can be executed by a computer system.

As shown in FIG. 3, test scenario creation is initiated for a target application (block 300). In some embodiments, for example, the test module 100 shown in FIG. 1 can be configured to initiate test scenario creation for the target application. The target application can be, for example, a business application, a finance application, an engineering application, and/or so forth. In some embodiments, the target application can be executed using an application module of a computer system.

During the test scenario creation, a plurality of interaction entries representing a sequence of user interactions with a plurality of user interface elements of the target application are defined (block 310). In some embodiments, for example, the interaction entry definition module 120 shown in FIG. 1 can be configured to define the plurality of interaction entries. The user interface elements of the target application can be, for example, any type of user interface element, such as a field or a button, associated with the target application, and the user interactions can be any type of interaction with the user interface elements. In some embodiments, the plurality of user interface elements can define a target application user interface of the target application.

The plurality of interaction entries is included in a test scenario file representing a test scenario (block 320). In some embodiments for example, the plurality of interaction entries can be included in the test scenario file by the test scenario compiler 140 shown in FIG. 1. In some embodiments, the test scenario file can be, for example, a series of entries in a database, a logically linked list of entries, a textual file, and/or so forth.

After a first portion of the sequence of user interactions have been performed and before a second portion of the sequence of user interactions have been performed, an indicator is received that a property of a user interface element from the plurality of user interface elements has been selected for verification (block 330). In some embodiments, for example, the checkpoint entry definition module 130 shown in FIG. 1 can be configured to receive the indicator of the property being selected for verification. In some embodiments, for example, the indicator of the property selected for verification can be selected via the checkpoint entry user interface 92 shown in FIG. 1. In some embodiments, the property can be, for example, a size of the user interface element, a variable associated with user interface element, and/or so forth.

A checkpoint entry configured to trigger verification of the property of the user interface element from the plurality of user interface elements based on the test scenario file during test scenario verification of the target application is defined (block 340). In some embodiments, for example, the checkpoint entry definition module 130 shown in FIG. 1 can be configured to define the checkpoint entry. In some embodiments, the test scenario compiler 140 shown in FIG. 1 can be configured to include the checkpoint entry in the test scenario file after the checkpoint entry has been defined.

Figure 4:
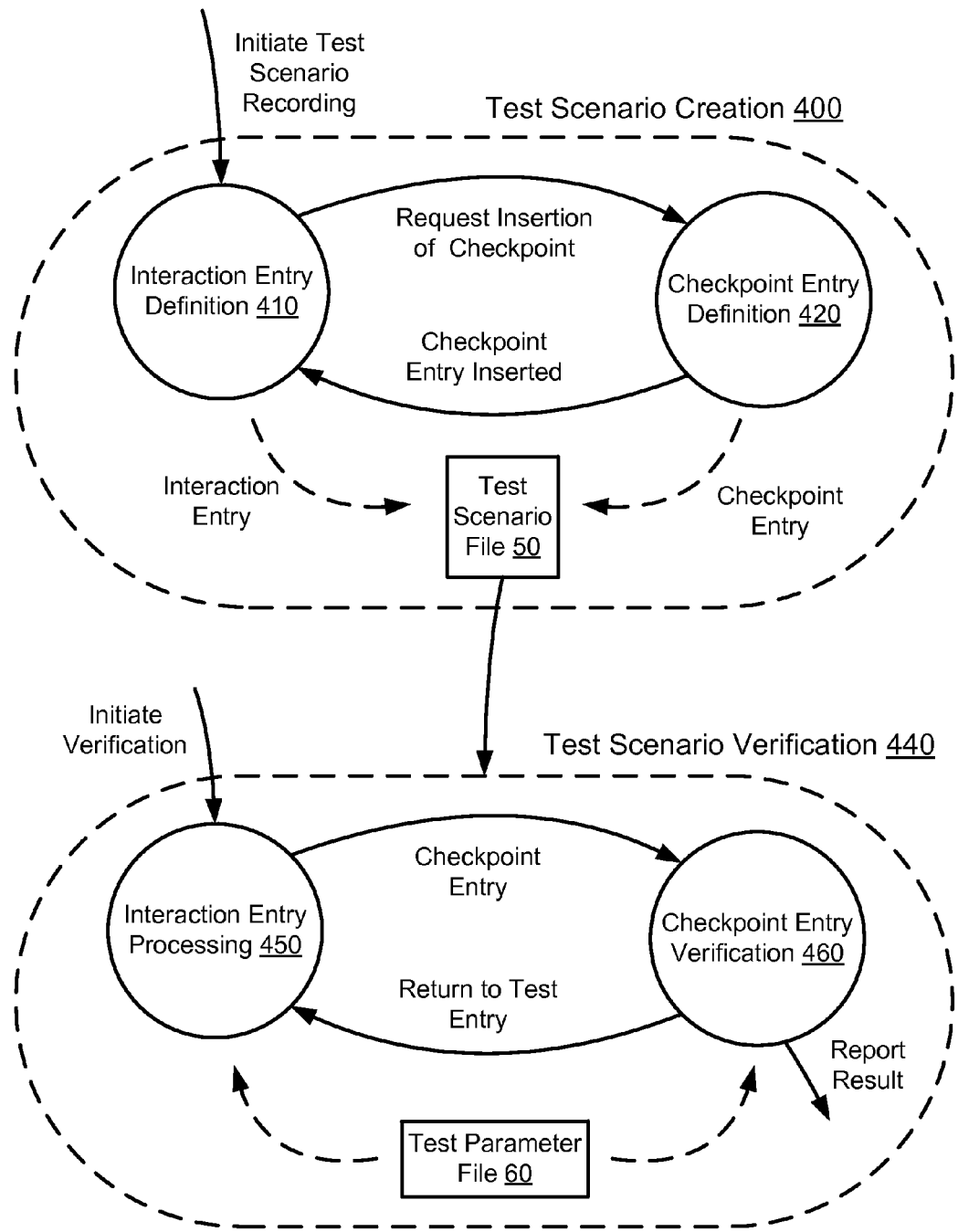
FIG. 4 is a diagram that illustrates test scenario creation and test scenario verification.

FIG. 4 is a diagram that illustrates test scenario creation 400 and test scenario verification 440. The test scenario creation 400 and test scenario verification 440 can be associated with a target application. In some embodiments, the test scenario creation 400 can be initiated by a user using a test module (e.g., the test module 100 shown in FIG. 1). Specifically, the test scenario creation 400 can be initiated by a user via a test module user interface (e.g., the test module user interface 90 shown in FIG. 1) associated with the test module.

As shown in FIG. 4, the test scenario creation 400 includes interaction entry definition 410 (e.g., an interaction entry definition state) and checkpoint entry definition 420 (e.g., a checkpoint entry definition state, a checkpoint entry definition time period). During the interaction entry definition 410, an interaction entry can be defined (e.g., automatically defined by an interaction entry definition module 120 shown in FIG. 1), and as shown in FIG. 4, the interaction entry can be included in a test scenario file 50 (e.g., automatically included in the test scenario file by the test scenario compiler 140 shown in FIG. 1) after the interaction entry has been defined. The interaction entry can be defined in response to an interaction of a user with a user interface element associated with the target application.

The checkpoint entry definition 420 is initiated in response to a request to insert a checkpoint into the test scenario file. During the checkpoint entry definition 420, a checkpoint entry can be defined (e.g., manually defined by a user using the checkpoint entry definition module 130 shown in FIG. 1), and as shown in FIG. 4, the checkpoint entry can be included in the test scenario file 50 (e.g., included in the test scenario file 50 by the test scenario compiler 140 shown in FIG. 1) after the checkpoint entry has been defined. One or more portions of the checkpoint entry (e.g., properties of user interface elements to be verified based on the checkpoint entry) can be defined by a user (e.g., based on selections by a user). After the checkpoint entry has been inserted into the test scenario file 50, interaction entry definition 410 can be resumed.

After the test scenario file 50 has been created, test scenario verification 440 of the target application can be initiated. In some embodiments, the test scenario verification 440 can be initiated by a user using a test scenario verification module (e.g., the test scenario verification module 150 shown in FIG. 1). Specifically, the test scenario for dictation 440 can be initiated by a user via a test module user interface (e.g., the test module user interface 90 shown in FIG. 1) associated with the test scenario verification module.

As shown in FIG. 4, the test scenario verification 440 includes interaction entry processing 450 and checkpoint entry verification 460. In some embodiments, interaction entries can be processed during interaction entry processing 450 in an order that the interaction entries appear in (are linked within) the test scenario file 50. For example, the test scenario verification module 150 can be configured to execute (e.g., replay, execute in a simulated fashion) the interactions of the user with the user interface elements of the target application based on the interaction entries in the order that they are included within (e.g., are linked within, appear within) the test scenario file 50.

In response to a checkpoint entry being encountered within the test scenario file 50, checkpoint entry verification 460 can be initiated as shown in FIG. 4. A property of a user interface element of the target application that is to be verified based on the checkpoint entry can be performed during checkpoint entry verification 460. In some embodiments, an expected value can be compared with a calculated value of the property of the user interface element (which can be calculated based on execution of the interactions the user with user interface elements of the target application based on the interaction entries in the order that they are included within (logically linked within) the test scenario file 50). In some embodiments, the expected value can be compared with the calculated value based on a condition (e.g., a Boolean operator) defined within the checkpoint entry.

In some embodiments, one or more checkpoint entries may be processed during checkpoint entry verification 460 based on the order that they are included within (e.g., are linked within) the test scenario file 50. For example, a checkpoint entry may be processed during checkpoint entry verification 460 only after an interaction entry included directly before (e.g., linked before) the checkpoint entry has been processed during interaction entry processing 450. The checkpoint entry may not be processed during checkpoint entry verification 460 before the interaction entry has been processed during interaction entry processing 450.

As shown in FIG. 4, a result (e.g., a success, a failure) of the verification of the property can be reported (e.g., stored). For example, in some embodiments, a notification can be defined based on verification of the property of the user interface element. The notification can be displayed for a user and/or sent to the user.

After verification based on one or more checkpoint entries has been performed during checkpoint entry verification 460, interaction entry processing 460 can be resumed. In some embodiments, interaction entry processing 450 may only be resumed after a result of the verification of the property has been reported.

A test parameter file 60, which is shown in FIG. 4, can be used in conjunction with the test scenario file 50 during interaction entry processing 460 and checkpoint entry verification 460 to verify at least a portion of a target application (e.g., verify a value of a property associated with a user interface element of the target application). For example, the test parameter file 60 can include multiple sets of test input values that are each associated with an expected value. Each set of test input values can be used in conjunction with the interaction entries of the test scenario file during interaction entry processing 460 to calculate a calculated value that can be verified during checkpoint entry verification 460 based on each expected value associated with each set of test input values. An example of a test parameter file is described in connection with FIG. 5 below.

FIG. 5 is a diagram that illustrates a test parameter file 500. As shown in FIG. 5, the test parameter file 500 includes sets of test input values 510, user interface element identifiers 520, property identifiers 530, conditions 540, and expected values 550. The test parameter file 500 can be used during test scenario verification in conjunction with a test parameter file during verification of a target application.

As shown in FIG. 5, the test parameter file 500 is related to a user interface element of a target application represented by the user interface element identifier ID1 (shown in column 520). The user interface element represented by the user interface element identifier ID1 can be referred to as user interface element ID1. The test parameter file 500 is also related to a property of the user interface element represented by property identifier PropA (shown in column 530). The property represented by the property identifier PropA can be referred to as property PropA. Although the test parameter file 500 is related only to property PropA of user interface element ID1, in some embodiments, a test parameter file can be related to more than one property of more than one user interface element.

As shown in FIG. 5, each of the sets of test input values 510 is associated with a condition from the conditions 540 and an expected value from the expected values 550. For example, the set of test input values IV1 through IV16 (shown in column 510) are associated with condition OP2 (shown in column 540) and expected value EV4 (shown in column 550).

As a specific example, the sets of test input values 510 included in the test parameter file 500, can each be used in conjunction with a test scenario file during test scenario verification. The test scenario file can include a sequence of interaction entries (representing a sequence of interactions of a user with user interface elements of a target application), and can include a checkpoint entry associated with property PropA of user interface element ID1. During a first iteration of test scenario verification, the set of test input values IV1 through IV6 (shown in column 510), which are associated with expected value EV1 (shown in column 550), can be used in conjunction with the sequence of the interaction entries to calculate a first calculated value. Specifically, a test input value from the set of test input values IV1 through IV6 can be inserted into a field (in lieu of an input value entered by a user during an interaction represented by an interaction entry). The first calculated value can be verified in response to the checkpoint entry based on the expected value EV1 (which is associated with the set of test input values IV1 through IV6) and based on the condition OP1 (shown in column 540) (which can be a Boolean operator). In some embodiments, failure or success of the verification can be reported. In some embodiments, other portions (the remaining portions) of the test parameter file 500 can be iteratively processed in a similar fashion as that described above during test scenario verification.

Figure 6A:
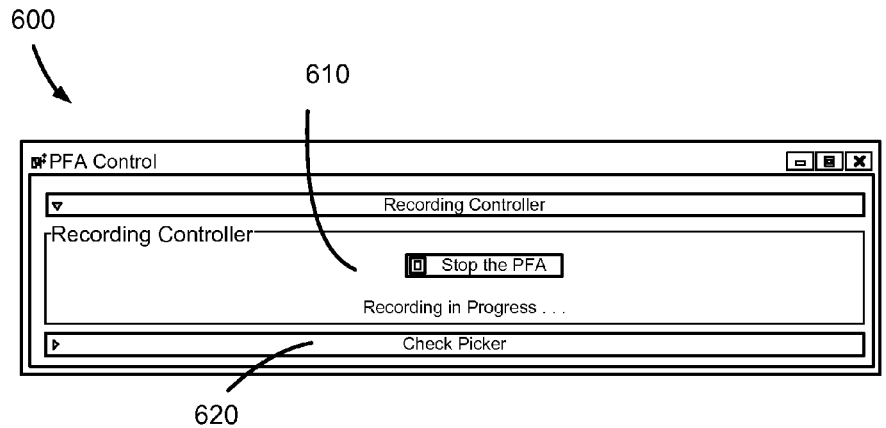
FIG. 6A is screenshot of an example of a user interface portion of a test module user interface.
Figure 6B:
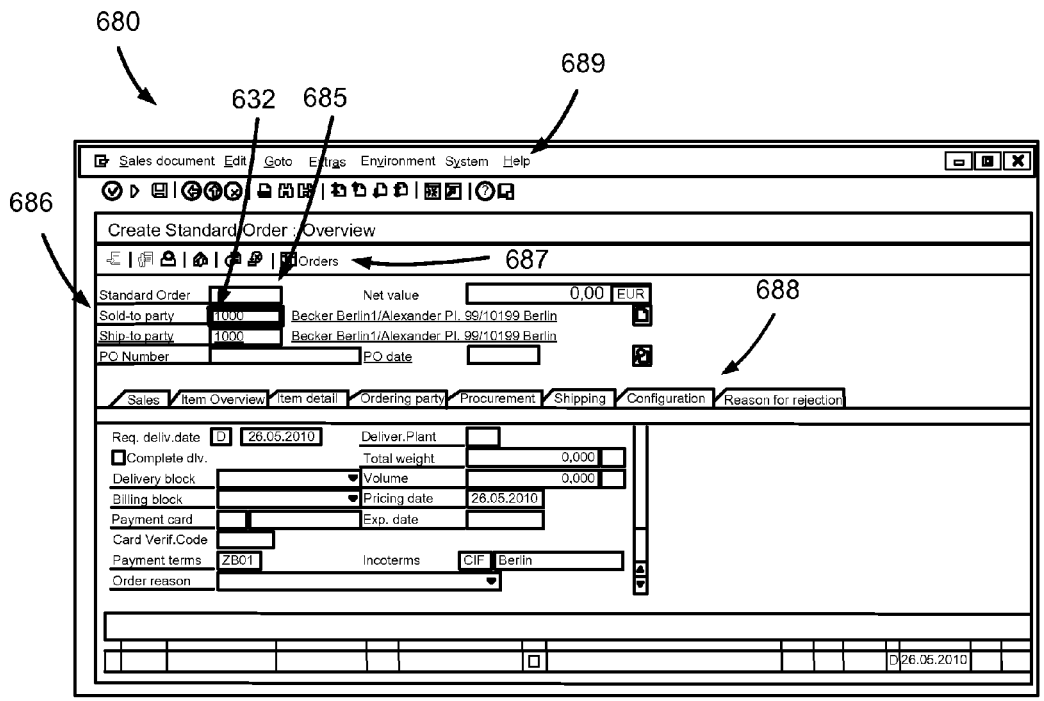
FIG. 6B is a screenshot of a portion of a target user interface of the target application that is the subject of test scenario creation described in connection with FIG. 6A.

FIG. 6A is screenshot of an example of a user interface portion 600 of a test module user interface. The user interface portion 600 can be a portion of the test module user interface 90 shown in FIG. 1. The user interface portion 600 is shown in FIG. 6A in a state after recording of a test scenario associated with a target application has been started as indicated by the "Recording in progress . . ." displayed within the user interface portion 600. As shown in FIG. 6A, the recording can be stopped by actuating button 610. A portion of a target user interface associated with the target application is shown in FIG. 6B.

Although not shown in FIG. 6A, the user interface portion 600 (or a portion of the test module user interface to which the user interface portion 600 is related) can be configured so that a user can trigger execution of a target application for which a test scenario can be recorded. In other words, the target application for which a test scenario is recorded can be launched using a portion of the user interface portion 600.

In some embodiments, various aspects of progress of recording of a test scenario can be communicated via the user interface portion 600. For example, information about (e.g., parameters of) interaction entries defined based on user interactions can be displayed within the user interface portion 600. In some embodiments, one or more interaction entries can be modified using the user interface portion 600 (or using a portion of the test module user interface to which the user interface portion 600 is related).

As shown in FIG. 6A, the user interface portion 600 includes a checkpoint entry user interface 620 in a collapsed configuration (which is labeled "Check Picker"). When the collapsed configuration of the checkpoint entry user interface 620 is accessed (e.g., selected), the checkpoint entry user interface 620 can be changed to an expanded configuration (which is shown in the expanded configuration in FIGS. 6C through 6F). The expanded configuration of the checkpoint entry user interface 620 can include various user interface elements that can be used to insert one or more checkpoints during recording of a test scenario. In other words, one or more checkpoint entries can be defined during test scenario creation after the checkpoint entry user interface 620 is changed from a collapsed configuration to an expanded configuration.

FIG. 6B is a screenshot of a portion of a target user interface 680 of the target application that is the subject of test scenario creation described in connection with FIG. 6A. As shown in FIG. 6B, the target user interface 680 includes several user interface elements (only some of which are labeled using numbers) including fields 685 into which characters (e.g., alphanumeric characters) can be inserted, labels 686, icons 687, tabs 688, menu controls 689, and/or so forth.

As shown in FIG. 6B, a value of the input field 632 (associated with the label "Sold-to party") is selected for verification using a checkpoint (e.g., a checkpoint entry). As shown in FIG. 6B the value (e.g., calculated value) of the input field 632 is "1000". The value of the input field 632 can be calculated based on a sequence of interactions of a user with the target user interface 680 of the target application.

In some embodiments, the input field 632 can be selected via the checkpoint entry user interface (after the checkpoint entry user interface 620 has been changed from the collapsed configuration shown in FIG. 6A to an expanded configuration). In some embodiments, the input field 632 can be selected using, for example, an input device such as a mouse device. In this embodiment, the input field 632 is highlighted with a box around the input field 632 when selected for verification using the checkpoint.

In some embodiments, a checkpoint entry associated with the value of the input field 632 can be defined with default values. For example, a checkpoint entry can be defined so that the text property of the input field 632 can be set to a default expected value that is the same as the calculated value of "1000". Thus, during test scenario verification, a value calculated using a replay of user interactions will be compared against the expected value of "1000".

Figure 6C:
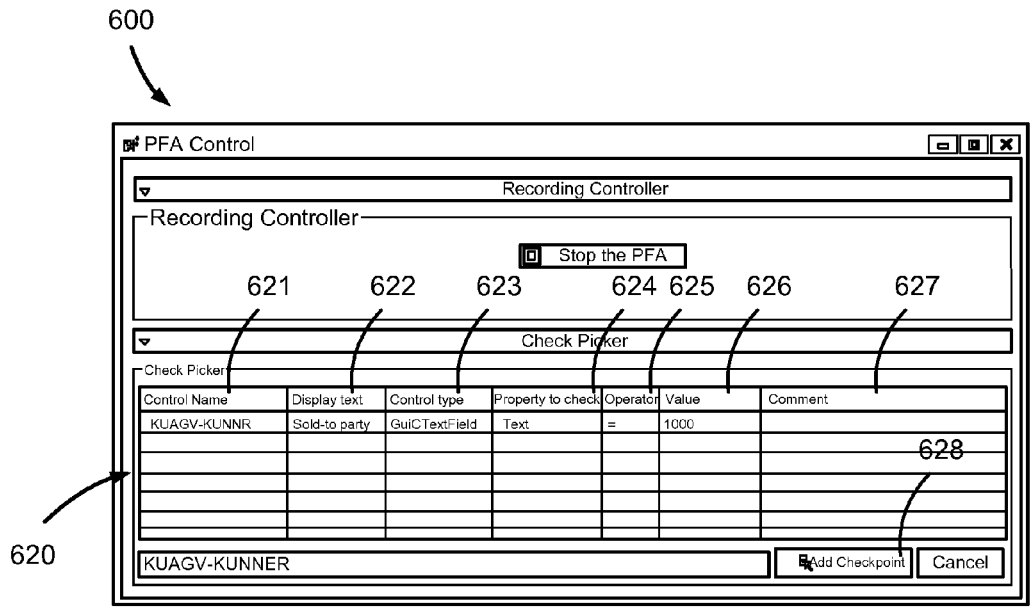
FIG. 6C is a screenshot of a checkpoint entry user interface in an expanded configuration within the user interface portion shown in FIG. 6A.

FIG. 6C is a screenshot of a checkpoint entry user interface 620 in an expanded configuration within the user interface portion 600 shown in FIG. 6A. As shown in FIG. 6C, the checkpoint entry user interface 620 is populated with information related to the input field 632 shown in FIG. 6B. The information included in the checkpoint entry user interface 620 can be used to define a checkpoint entry that can be included in a test scenario file (not shown). In other words, the information shown in the checkpoint entry user interface 620 are parameters of a checkpoint entry, and can be referred to as such. In this embodiment, a checkpoint entry that includes the parameters shown in the checkpoint entry user interface 620 can be defined in response to the button 628 (labeled "Add checkpoint") being actuated (e.g., selected), and the checkpoint entry can be included in a test scenario file.

Specifically, the control name column 621 includes an identifier (i.e., a user interface element identifier of "KUAGV-KUNNR") used to identify the input field 623. The display text column 622 includes the label (i.e., "Sold-to party") associated with the input field 632, and the control type column 623 identifies the type (i.e., "GuiCTextField") of user interface element of the input field 632. The property to check column 624 indicates the property (i.e., "text") that is to be verified during verification using a checkpoint. The value column 626 indicates the expected value (i.e., "1000") that is to be verified, and the operator includes an indicator of a condition (i.e., Boolean operator of equals) that is to be applied when comparing the expected value with a calculated value. In this embodiment, comments associated with this checkpoint are not included in the comment column 627.

Figure 6D:
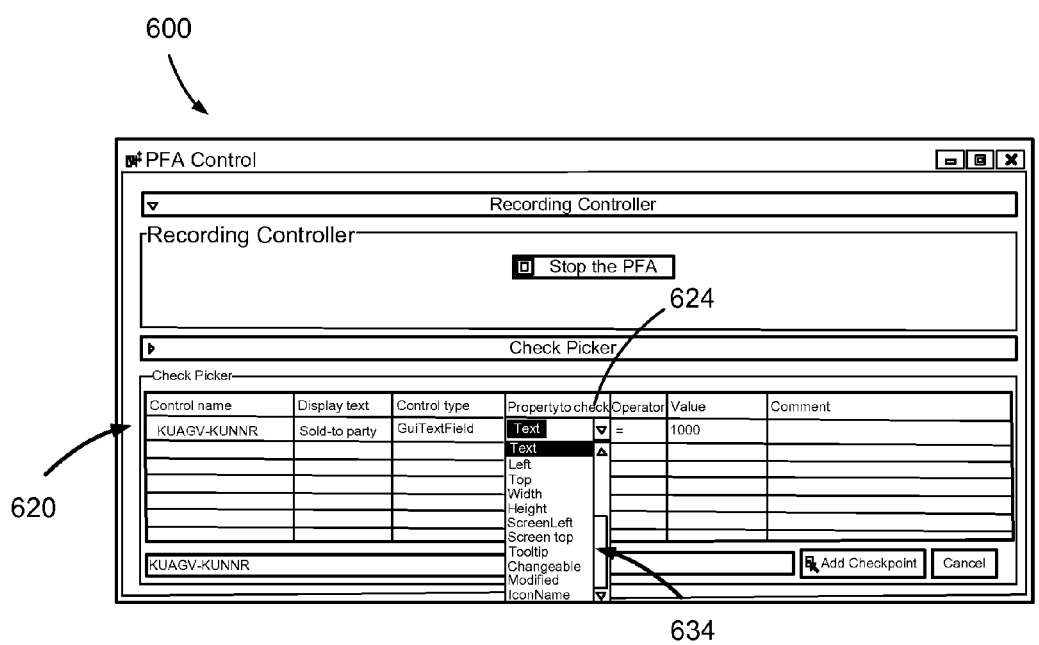
FIG. 6D is a screenshot that illustrates a drop-down menu associated with the checkpoint entry user interface shown in FIG. 6C.

FIG. 6D is a screenshot that illustrates a drop-down menu 634 associated with the checkpoint entry user interface 620 shown in FIG. 6C. As shown in FIG. 6D, the drop-down menu 634 can be used to select a different value for the property to check column 624 than that shown in FIG. 6C. In some embodiments, the drop-down menu 634 can be populated based on properties discovered using the property module 132 shown in FIG. 1.

In some embodiments, the properties included in a drop-down menu, such as drop-down menu 634 shown in FIG. 6D, can be defined so that they are compatible with a test scenario file (not shown) and/or a tool (not shown) used to implement test scenario verification. In other words, one or more properties (e.g., property types) included in the drop-down menu can be filtered based on compatibility with, for example, an application used to implement test scenario verification and/or a portion of a test module (e.g., the interaction entry definition module 120 of the test module 100 shown in FIG. 1). As a specific example, the properties included in the drop-down menu 634 may only be included in the drop-down menu 634 if they are primitive type properties (e.g., integer, long, double, string) that can be handled by the test scenario verification module 150 shown in FIG. 1.

Figure 6E:
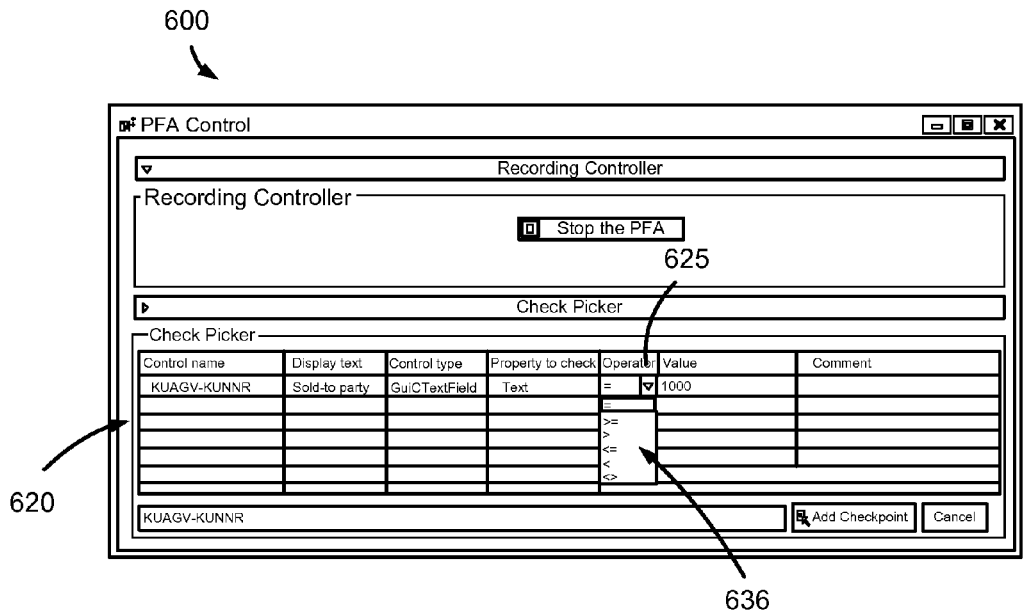
FIG. 6E is a screenshot that illustrates another drop-down menu associated with the checkpoint entry user interface shown in FIG. 6C.

FIG. 6E is a screenshot that illustrates another drop-down menu 636 associated with the checkpoint entry user interface 620 shown in FIG. 6C. As shown in FIG. 6D, the drop-down menu 636 can be used to select a different operator for operator column 625 than that shown in FIG. 6C.

In some embodiments, the implementation of a condition (e.g., a Boolean operator) may depend on a property type. For example, a particular comparison of a calculated value with an expected value may not be properly performed using a Boolean operator unless the calculated value and the expected value are both, for example, strings (or are converted into strings). In some embodiments, conversion of a calculated value and/or an expected value can be automatically performed, in accordance with a condition, so that processing based on the condition can be properly executed during test scenario verification.

As illustrated by FIGS. 6D and 6E, a checkpoint entry (which can be defined using the checkpoint entry user interface 620) can be customized using drop-down menus associated with the checkpoint entry user interface 620. Although not shown, in some embodiments, any of the columns of the checkpoint entry user interface 620 can have selectable options (such as drop-down menus shown in FIGS. 6D and 6E) that can be used to customize a checkpoint entry.

Figure 6F:
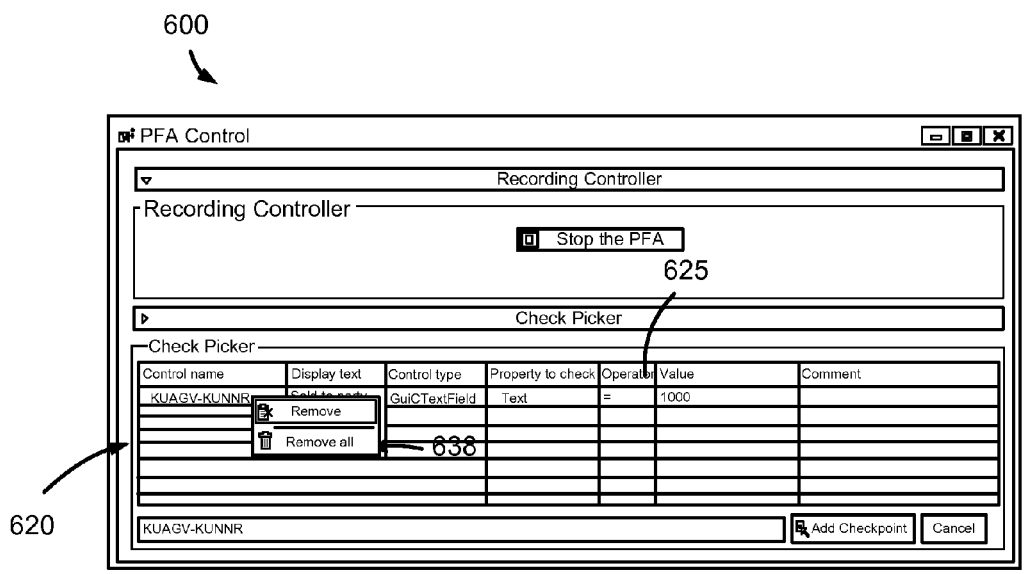
FIG. 6F is a screenshot that illustrates a removal menu associated with the checkpoint entry user interface shown in FIG. 6C.

FIG. 6F is a screenshot that illustrates a removal menu 638 associated with the checkpoint entry user interface 620 shown in FIG. 6C. A selected set of parameters associated with a particular user interface element can be removed (so that a checkpoint entry may not be defined) using the "Remove" option, or all sets of parameters associated with one or more user interface elements can be removed using the "Remove all" option.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system including instructions stored on a non-transitory computer-readable storage medium, the computer system comprising:
   a test module configured to initiate test scenario creation for a target application;
   an interaction entry definition module configured to define, during the test scenario creation, a plurality of interaction entries representing a sequence of user interactions with a plurality of user interface elements of the target application;
   a test scenario compiler configured to include the plurality of interaction entries in a test scenario file representing a test scenario; and
   a checkpoint entry definition module configured to activate, after a first portion of the sequence of user interactions have been performed and before a second portion of the sequence of user interactions have been performed, a checkpoint entry user interface to insert a checkpoint in the test scenario file while recording the plurality of interaction entries, the checkpoint entry definition module configured to receive, via the checkpoint entry user interface, an indicator that a property of a user interface element from the plurality of user interface elements has been selected for verification, and configured to define the checkpoint entry configured to trigger verification of the property of the user interface element from the plurality of user interface elements based on the test scenario file during test scenario verification of the target application, wherein the interaction entry definition module is configured to resume recording interaction entries associated with the second portion when the checkpoint entry user interface is deactivated.

2. The computer system of claim 1, wherein the defining of the plurality of interaction entries by the interaction entry definition module is performed during a time period that is mutually exclusive from a time period during which the defining of the checkpoint entry is performed by the checkpoint entry definition module.

3. The computer system of claim 1, wherein the plurality of interaction entries and the check point entry are each defined during a continuous test scenario creation time period initiated when the test scenario creation mode is initiated.

4. The computer system of claim 1, wherein the checkpoint entry is defined based on a plurality of user interactions with a user interface mutually exclusive from the target application, the plurality of user interactions are mutually exclusive from the sequence of user interactions associated with the plurality of interaction entries.

5. The computer system of claim 1, wherein the test module is configured to terminate the test scenario creation, the test scenario file includes a plurality of checkpoint entries including the checkpoint entry when the test scenario creation mode is terminated.

6. The computer system of claim 1, wherein the test scenario compiler is configured to include the checkpoint entry in the test scenario file in a logical location between a first portion of the plurality of interaction entries representing the first portion of the sequence of user interactions, and a second portion of the plurality of interaction entries representing the second portion of the sequence of user interactions.

7. The computer system of claim 1, wherein the checkpoint entry includes an expected value of the property and a condition, the computer system further comprising:
a test scenario verification module configured to trigger calculation of a calculated value of the property of the user interface element from the plurality of user interface elements in response to manipulation of the target application based on the interaction entries included in the test scenario file,
the test scenario verification module configured to compare the calculated value of the property and the expected value of the property included in the checkpoint entry based on the condition included in the checkpoint entry.

8. The computer system of claim 1, further comprising:
a test scenario verification module configured to trigger defining of a plurality of calculated values of the property for comparison with a plurality of expected values of the property in response to iterative manipulation of the target application based on the interaction entries included in the test scenario file and a plurality of test input values associated with the plurality of expected values of the property.

9. The computer system of claim 1, further comprising:
a property module configured to discover a plurality of properties associated with the user interface element from the plurality of user interface elements, and provide, via the checkpoint entry user interface, the plurality of properties for selection,
wherein the checkpoint entry definition module is configured to receive a selection of at least one property from the plurality of properties via the checkpoint entry user interface.

10. The computer system of claim 1, wherein each interaction entry from the plurality of interaction entries has an order within the test scenario file that corresponds with an order of a user interaction within the sequence of user interactions,
the checkpoint entry is included in the test scenario file in a logical location between a first portion of the plurality of interaction entries corresponding with the first portion of the sequence of user interactions, and a second portion of the plurality of interaction entries corresponding with the second portion of the sequence of user interactions.

11. The computer system of claim 1, wherein the checkpoint entry user interface provides a plurality of default values associated with the checkpoint to be inserted, and receives a modification to at least one default value during a checkpoint entry definition time period occurring during the test scenario creation.

12. The computer system of claim 1, wherein a context is changed from interactions with the user interface elements of the target application to interactions with the checkpoint entry user interface associated with the checkpoint entry definition module when the checkpoint entry is defined, the defining of the plurality of interaction entries by the interaction entry definition module is paused when the checkpoint entry is defined.

13. A non-transitory computer-readable storage medium storing code representing instructions that when executed are configured to cause a processor to perform a process, the code comprising code to:
initiate test scenario creation for a target application;
define, during the test scenario creation, a plurality of interaction entries representing a sequence of user interactions with a plurality of user interface elements of the target application;
include the plurality of interaction entries in a test scenario file representing a test scenario;
activate a checkpoint entry user interface while recording the plurality of interaction entries, the checkpoint entry user interface configured to insert a checkpoint in the test scenario file during the test scenario creation;
suspend the recording of at least a portion of the plurality of interaction entries while the checkpoint entry user interface is activated;
receive, via the checkpoint entry user interface, an indicator that a property of a user interface element from the plurality of user interface elements has been selected for verification;
define the checkpoint entry configured to trigger verification of the property of the user interface element from the plurality of user interface elements based on the test scenario file during test scenario verification of the target application and
resume the recording of the at least a portion of the plurality of interaction entries upon deactivation of the checkpoint entry user interface.

14. The non-transitory computer-readable storage medium of claim 13, wherein the checkpoint entry is defined based on a plurality of user interactions with the checkpoint entry user interface that is mutually exclusive from the target application, the plurality of user interactions are mutually exclusive from the sequence of user interactions associated with the plurality of interaction entries.

15. The non-transitory computer-readable storage medium of claim 13, wherein the plurality of interaction entries and the checkpoint entry are each defined during a continuous test scenario creation time period initiated when the test scenario creation mode is initiated.

16. The non-transitory computer-readable storage medium of claim 13, further comprising:
   terminate the test scenario creation mode, the test scenario file including a plurality of checkpoint entries including the checkpoint entry when the test scenario creation mode is terminated.

17. The non-transitory computer-readable storage medium of claim 13, wherein the defining of the plurality of interaction entries by the interaction entry definition module is performed during a time period that is mutually exclusive from a time period during which the defining of the checkpoint entry is performed by the checkpoint entry definition module.

18. A method including executing instructions recorded on a non-transitory computer-readable storage media using at least one processor, the method comprising:
   initiating test scenario creation for a target application;
   defining, during the test scenario creation, a plurality of interaction entries representing a sequence of user interactions with a plurality of user interface elements of the target application;
   including the plurality of interaction entries in a test scenario file representing a test scenario;
   activating a checkpoint entry user interface while recording the plurality of interaction entries, the checkpoint entry user interface configured to insert a checkpoint in the test scenario file during the test scenario creation;
   discovering a plurality of properties of a user interface element associated with the checkpoint to be inserted;
   providing, via the checkpoint entry user interface, the plurality of properties for selection;
   receiving a selection of at least one property from the plurality of properties via the checkpoint entry user interface; and
   defining the checkpoint entry configured to trigger verification of the at least one property of the user interface element based on the test scenario file during test scenario verification of the target application.

19. The method of claim 18, wherein the checkpoint entry is defined based on a plurality of user interactions with the checkpoint entry user interface that is mutually exclusive from the target application, the plurality of user interactions are mutually exclusive from the sequence of user interactions associated with the plurality of interaction entries.

20. The method of claim 18, wherein the defining of the plurality of interaction entries by the interaction entry definition module is performed during a time period that is mutually exclusive from a time period during which the defining of the checkpoint entry is performed by the checkpoint entry definition module.

* * * * *